H. N. LEASK.
MEANS FOR UTILIZING THE HEAT OF CLINKER WITHDRAWN FROM REFUSE DESTRUCTORS, &c.
APPLICATION FILED SEPT. 9, 1907.

964,282.

Patented July 12, 1910.

2 SHEETS—SHEET 1.

WITNESSES.

INVENTOR
Henry N. Leask
By
James L. Norris
Atty.

THE NORRIS PETERS CO., WASHINGTON, D. C.

H. N. LEASK.
MEANS FOR UTILIZING THE HEAT OF CLINKER WITHDRAWN FROM REFUSE DESTRUCTORS, &c.
APPLICATION FILED SEPT. 9, 1907.

964,282.

Patented July 12, 1910.

2 SHEETS—SHEET 2.

WITNESSES.

INVENTOR.
Henry N Leask

UNITED STATES PATENT OFFICE.

HENRY NORMAN LEASK, OF EGREMONT, ENGLAND.

MEANS FOR UTILIZING THE HEAT OF CLINKER WITHDRAWN FROM REFUSE-DESTRUCTORS, &c.

964,282.

Specification of Letters Patent. Patented July 12, 1910.

Application filed September 9, 1907. Serial No. 392,005.

*To all whom it may concern:*

Be it known that I, HENRY NORMAN LEASK, British subject, and resident of Egremont, county of Chester, England, have invented certain new and useful Improvements in Means for Utilizing the Heat of Clinker Withdrawn from Refuse-Destructors, &c., of which the following is a specification.

This invention relates to means for recovering the heat from the clinker withdrawn from furnaces of all kinds more particularly from the furnaces of refuse destructors and similar furnaces in which a large proportion of clinker is formed and utilizing same to heat the air supplied to the furnace.

It consists essentially in arranging under the furnace a suitable chamber or grate which may or may not be separate from the ashpit into which the hot clinker falls as it is raked out of the furnace and through which by a suitable arrangement of ducts and dampers the air supply may be passed on its way to the furnace.

The invention will be fully described with reference to the accompanying drawings in which the invention is shown as applied to a refuse destructor.

Figure 2:
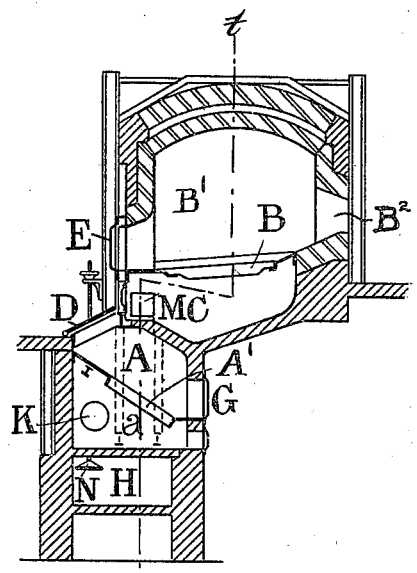
Figure 1:
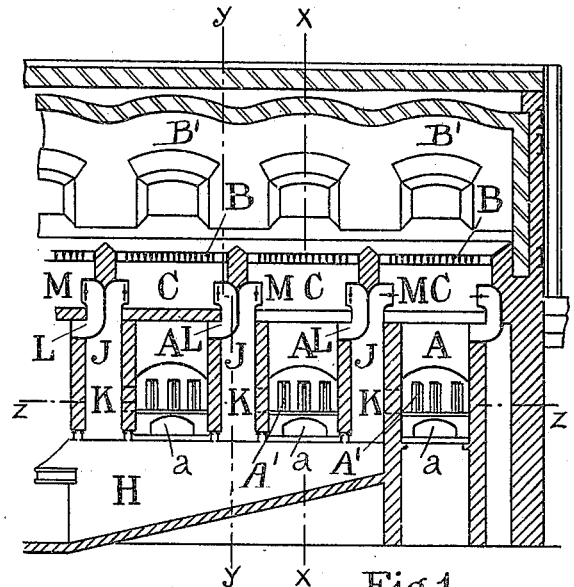
Figure 3:
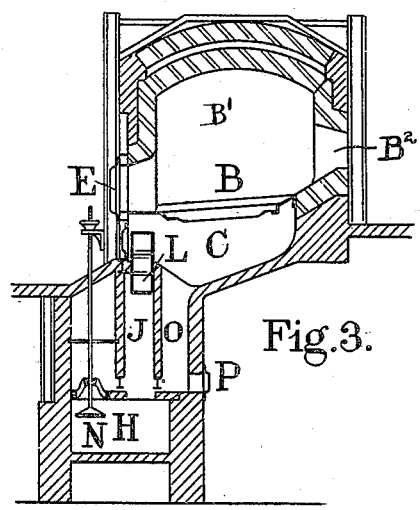
Figure 4:
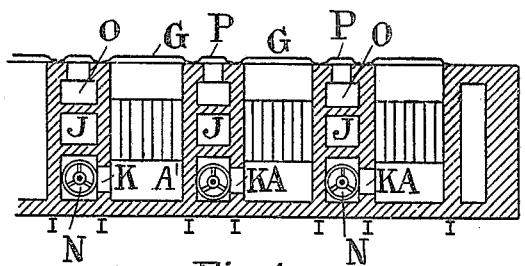
Figure 7:
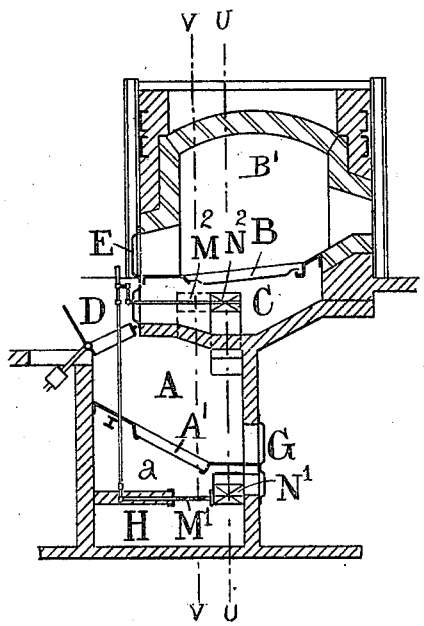
Figures 5, 6:
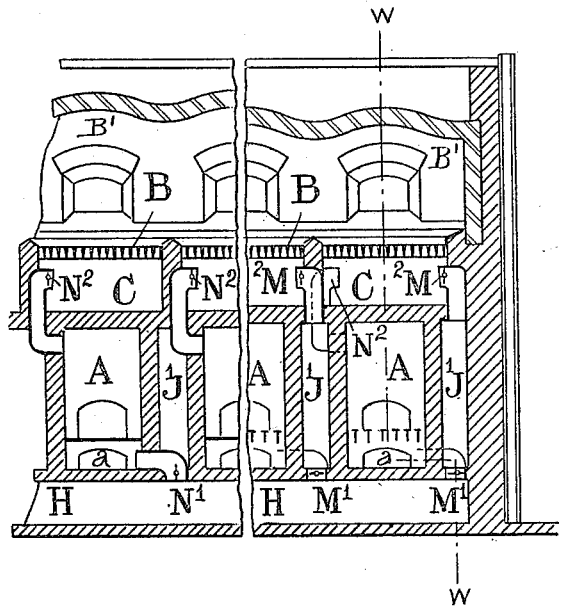

Figure 1 is a longitudinal vertical section taken in the plane of the line $t$—$t$, Fig. 2, and showing a destructor involving the invention. Fig. 2 is a transverse vertical section on the line $x$—$x$, Fig. 1. Fig. 3 is a transverse vertical section on the line $y$—$y$, Fig. 1. Fig. 4 is a horizontal section taken in the plane of the line $z$—$z$, Fig. 1. Fig. 5 is a longitudinal vertical section on the line $v$—$v$, Fig. 7, and illustrating a modified construction. Fig. 6 is a longitudinal vertical section on the line $u$—$u$, Fig. 7. Fig. 7 is a transverse vertical section on the line $w$—$w$, Fig. 5.

As shown in Figs. 1 to 4 a clinker receiving chamber A provided with a grate A' is constructed under the grate B of a combustion chamber as B' and below and separate from the ashpit C. This chamber A is provided with a suitable door D for the introduction of the clinker arranged under the clinker removing door E of the combustion chamber B' so that as the clinker is raked out it falls into the clinker receiving chamber A. The combustion chamber B' is provided with a fuel feeding opening B². The chamber A is preferably arranged below and separate from the ashpit C but not necessarily so.

The grate A' of the clinker receiving chamber A may consist of several bars arranged in a similar manner to fire bars which are preferably inclined as shown and on to which the clinker falls and a second door G is provided for withdrawing the cooled clinker.

The main air supply duct H is arranged underneath the clinker receiving chambers A and connected by branch ducts J which preferably pass between the clinker grates with the ashpits C of the combustion chamber B' and normally supply the furnaces with air. A passage K from the main air duct H is also made to the portion $a$ of the clinker receiving chamber A underneath the grate A' and another connection L is made from that part of the chamber above the bars to the ashpit C.

Suitable valves or dampers M N are arranged for respectively closing the branch air inlet J and opening the inlet K through the clinker grate so that when the hot clinker is removed or withdrawn from the furnace B into the clinker grate A' the main inlet may be closed and the air directed through the hot clinker till the latter is cooled. The heated air in the case of refuse destructors may be used to aid in driving off the excess of moisture frequently present in a new charge of refuse.

The ashpit C is separate from the clinker grate as shown in Fig. 3 the floor of the former being preferably inclined and a pit O is arranged at the lowest part communicating with a door P through which the ashes may be removed. The pit O serves as a receptacle for the ashes falling into the ash pit C from the main furnace B, as shown in Fig. 3. These ashes are withdrawn through the door P. The passages or openings K are inlets for the air from the main duct H into the space $a$ below the clinker cooling grate A'.

In the modification shown in Figs. 5 and 6 a different arrangement of the ducts and dampers is shown said dampers being designated by M', M², N' and N² and being separable as in the arrangement hereinbefore described to cause the passage of the air through the combustion chamber direct or through the combustion chamber by way of any one of the clinker chambers. In this construction, air supplied to the furnace comes through the main duct H, as in the previous instance, and under ordinary circumstances passes to the ash pit C through the valve M', the passage J' between the clinker cooling grates A' and the valves M². When a grate B has been cleared of clinker and the hot clinker has been deposited upon the clinker grate A', the valves M' and M² are closed and the air is directed through the hot clinker and thence to the ash pit through the valves N' and N² which are opened to allow the air to pass through them. In both forms of the invention the door or opening through which the clinker passes during its travel from the combustion chamber is arranged exteriorly of the furnace.

What I claim as my invention and desire to protect by Letters Patent is:—

1. A furnace comprising a combustion chamber having a closed bottom and a fuel supply opening and a clinker discharge opening at a point opposite the fuel supply opening and located above the grate, and a clinker receiving chamber arranged below and separate from the combustion chamber and having an inclined grate therein and also provided with an upper clinker inlet opening adjacent to the clinker discharge opening of the said combustion chamber, the heat of the clinker in the clinker receiving chamber being utilized to heat the air supply for the combustion chamber.

2. A furnace comprising a combustion chamber having a grate and a fuel supply opening, a clinker receiving chamber below and separate from the combustion chamber, the combustion and clinker chambers having openings for the withdrawal of the clinker from the combustion chamber and deposit thereof into the clinker receiving chamber, a main air supply duct in communication with the combustion chamber and having distinct means for establishing communication with the clinker chamber, and independently operative means for cutting off the supply of air to either the combustion chamber or the clinker receiving chamber, the clinker heating its chamber, and the heat utilized in heating the air supplied to the combustion chamber.

3. A furnace comprising a combustion chamber having a fuel supply opening and a clinker outlet above the grate thereof and independent of the supply opening for the fuel, a clinker receiving chamber separate from the combustion chamber and having a clinker receiving opening adjacent to the outlet of the combustion chamber, a main air supply duct in communication with the combustion chamber and provided with means for establishing communication with the clinker receiving chamber, communicating means between the upper portion of the clinker receiving chamber and the combustion chamber, and means for cutting off the supply of air to either the combustion chamber or clinker receiving chamber.

4. A furnace comprising a combustion chamber having a fuel supply opening and an additional opening passing through to the exterior thereof for withdrawal of clinker therefrom and independent of the fuel supply opening, a clinker receiving chamber separate from the combustion chamber and having a clinker introducing opening exterior of the furnace and adjacent to the clinker withdrawal opening of the combustion chamber, the clinker receiving chamber also having an outlet opening below the said clinker introducing opening for the discharge of the cooled clinker, and an inclined grate in the said clinker receiving chamber and leading from a point near the clinker introducing opening to the discharge opening for the cooled clinker and over which the clinker gravitates toward said discharge opening, the heat units of the clinker in the clinker receiving chamber being utilized to heat the air supply for the combustion chamber.

In witness whereof, I have hereunto signed my name in the presence of two subscribing witnesses.

HENRY NORMAN LEASK.

Witnesses:
  I. Owden O'Brien,
  Harry Barnfather.